US009886735B2

(12) United States Patent
Soum et al.

(10) Patent No.: US 9,886,735 B2
(45) Date of Patent: Feb. 6, 2018

(54) HYBRID ENGINE FOR CENTRAL PROCESSING UNIT AND GRAPHICS PROCESSOR

(71) Applicant: ALLEGORITHMIC, Clermont-Ferrand (FR)

(72) Inventors: Christophe Soum, Clermont-Ferrand (FR); Eric Batut, Clermont-Ferrand (FR)

(73) Assignee: ALLEGORITHMIC, Clermont-Ferrand (FR)

( * ) Notice: Subject to any disclaimer, the term of this patent is extended or adjusted under 35 U.S.C. 154(b) by 0 days.

(21) Appl. No.: 14/430,112

(22) PCT Filed: Sep. 12, 2013

(86) PCT No.: PCT/IB2013/002005
§ 371 (c)(1),
(2) Date: Mar. 20, 2015

(87) PCT Pub. No.: WO2014/045094
PCT Pub. Date: Mar. 27, 2014

(65) Prior Publication Data

US 2015/0235339 A1 Aug. 20, 2015

(30) Foreign Application Priority Data

Sep. 24, 2012 (FR) ..................................... 12 02528

(51) Int. Cl.
*G06F 15/167* (2006.01)
*G06T 1/20* (2006.01)
(Continued)

(52) U.S. Cl.
CPC ................. *G06T 1/20* (2013.01); *G06T 1/60* (2013.01); *G06T 11/001* (2013.01)

(58) Field of Classification Search
CPC ........... G06T 1/20; G06T 11/001; G06T 1/60
See application file for complete search history.

(56) References Cited

U.S. PATENT DOCUMENTS

2005/0231502 A1 10/2005 Harper et al.
2013/0055272 A1* 2/2013 Munshi .................... G06F 8/41 718/102

OTHER PUBLICATIONS

Tim Tutenel, Procedural filters for customization of virtual worlds Proceedings of the 2nd International Workshop on Procedural Content Generation in Games, PCGames '11, Article No. 5 ISBN: 978-1-4503-0872-4.*

(Continued)

*Primary Examiner* — Xiao Wu
*Assistant Examiner* — Mohammad H Akhavannik
(74) *Attorney, Agent, or Firm* — Karceski IP Law, PLLC

(57) ABSTRACT

A method is described for generating procedural textures for a computer having a unified CPU/GPU memory architecture, to generate textures for contents that are managed by a graphics card (GPU), and including the steps of: receiving the data of a graph consisting of a plurality of filters and sequentially traversing said graph such as to allow, for each filter traversed, the steps of: identifying the processor preselected for executing this filter; receiving the instructions for the preselected version of the filter; receiving parameters of the current filter; receiving the buffer addresses of the current filter; applying the values provided for the digital-valued filter inputs; executing the filter instructions with the set parameters; storing the intermediate results obtained; and, when all of the filters of the graph have been executed, generating at least one display texture.

3 Claims, 4 Drawing Sheets

Start of graph traversal
Read next filter and its parameters from M0
Read most appropriate target of current filter from M1
Does the filter target the CPU or GPU?
GPU
CPU
Read GPU program of current filter from M4
Set parameters (read from M0) and internal buffers (M2) through GPU driver
Activate filter on GPU through GPU driver and wait for result
Read CPU program of current filter from M3
Set parameters (read from M0) and internal buffers (M2)
Activate filter on CPU and wait for result
Has the graph been entirely computed?
NO
YES
End of graph traversal

(51) Int. Cl.

*G06T 1/60* (2006.01)

*G06T 11/00* (2006.01)

(56) References Cited

OTHER PUBLICATIONS

George Kyriazis, AMD, Heterogeneous System Architecture: A Technical Review, Rev. 1.0, Aug. 30, 2012.*

Allegorithmic: "Allegorithmic Substance, Threaded Middleware", Mar. 31, 2009, retrieved from internet: http://de.slideshare.net/guest40fc7cd/threading-successes-06-allegorithmic.

Allegorithmic: "Substance: Unleashing online gaming with descriptive textures". Mar. 2009, retrieved from internet: http://download.allegorithmic.com/documents/brochures/substance_air_white_paper_march09.pdf.

International Search Report dated Feb. 12, 2004, for International Patent Application No. PCT/IB2013/002005.

* cited by examiner

HYBRID ENGINE FOR CENTRAL PROCESSING UNIT AND GRAPHICS PROCESSOR

CROSS-REFERENCE TO RELATED APPLICATIONS

This is a National Stage Entry into the United States Patent and Trademark Office from International PCT Patent Application No. PCT/1132013/002005, having an international filing date of Sep. 12, 2013, which claims priority to French Patent Application No. FR 12/02528, filed Sep. 24, 2012, the entire contents of both of which are incorporated herein by reference.

TECHNICAL FIELD OF THE INVENTION

The present invention relates to a method for generating procedural textures for a computer having a unified CPU/GPU memory architecture, to generate from digital data and operators of a plurality of procedural filters interpreted by a rendering engine, textures for contents that are managed by a graphics card (GPU). It also relates to the corresponding device.

The device and method disclosed herein are advantageously provided for use with an engine for generating procedural textures such as, for example, the engine developed by the applicant and referred to as substance. Such an engine can generate a variety of dynamic and configurable textures in various resolutions, starting from a description file, which stores:

- the basic elements (noises, patterns, pre-existing images);
- the parameters employed for generating these basic elements, if appropriate;
- the various filtering steps applied to these basic elements or to the images generated by previous filtering steps;
- the parameters which modify the operation mode of these filters;
- the dependencies of each filter (list of inputs used by each operation);
- the list of textures to be output, their format, as well as their intended use.

On execution, this description file is interpreted by the rendering engine and a computation graph is constructed based on the information retrieved from the description file. An example computation graph is shown in FIG. 1.

By construction, the graph thus constructed satisfies the dependencies between the filters and therefore contains the information about the order in which the different filters must be activated in order to generate the desired outputs.

STATE OF THE ART

Such an engine may be used on a variety of platforms: desktop computers (PC, Mac), game consoles, mobile terminals. Today, these platforms comprise two computing units, which can be used when rendering a procedural texture: the CPU ("Central Processing Unit", or "central processor") and the GPU (Graphical Processing Unit, or "graphics card").

The CPU is the central processing unit of a computer, which is responsible for executing the operating system as well as running the applications used. Present CPUs include a small number of cores that are capable of performing tasks in parallel, typically 4 or 6. These processor cores are highly sophisticated and can carry out complex operations. Moreover, these processor cores access the main memory through a cache memory system, which is intended to reduce the access time to recently used data.

The GPU is an additional processor dedicated for graphical operations (texture composition, 3D geometry operations, lighting computations, post-processing of images, etc.). The GPU is responsible for the computation of the final image displayed on the screen based on the information provided by the CPU. Present GPUs include a very large number of computing units, typically several hundreds. These computing units are primarily dedicated for a certain type of operations and are much less sophisticated than the CPU cores. Furthermore, since these computing units essentially manipulate images, they access their working memory through blocks, whose task is to sample the textures used. These blocks, referred to as texture samplers, perform a number of operations in a wired manner: interpolation, bi- or tri-linear filtering, management of the detail level for textures available in close/moderately close/far versions, decompression of compressed textures, etc. Moreover, due to the number of integrated cores and the resulting silicon surface area, the GPUs are clocked at smaller frequencies than those of the CPUs. When rendering a texture by means of a rendering engine such as "Substance", the sequencer must traverse the graph and execute each filter in an order that ensures the availability of valid inputs for each filter. Conventional versions of rendering engines such as that of the applicant execute all of the available filters on a single computing unit.

Document XP055058315 entitled "Procedural Textures on multi-core" is a technical and marketing presentation of a method for generating procedural textures for a multi-core architecture processor. The "threading" discussed in this document (in particular the section of page 15 which pertains to the "threading strategies") relates to the way tasks or threads are distributed in a multi-core processor according to the available cores. This document does not disclose a method for generating procedural textures using either the CPU or the GPU. Moreover, although two product versions are disclosed, namely one for CPUs and one for GPUs, these two versions are entirely independent.

Document XP002662009 entitled "Substance: Unleashing online gaming with descriptive textures" describes a tool for editing procedural textures and an engine for rendering such textures using generator and transformation filters.

As may be seen, these approaches are quite recent and result in a high need for optimization in order to achieve satisfactory performance levels for present applications with very rich graphical and virtual contents.

A first object of the invention is to provide a method for generating procedural textures, which is more efficient and faster than traditional processes.

Another object of the invention is to provide a method for generating procedural textures, which is capable of operating in substantially real time.

Yet another object of the invention is to provide a device for generating procedural textures adapted to provide substantially improved rendering speed performance, without any loss in the quality of the generated images.

DISCLOSURE OF THE INVENTION

On desktop computers, the CPU and GPU do not access the same memory. Before any graphical computation, the CPU must retrieve the data stored in the main memory, and transfer it to the GPU, which will store it in a dedicated memory. This transfer is managed by the GPU driver software, and is most often asymmetric: transferring data to the GPU is much faster than transferring it from the GPU. An example of such an architecture is shown in FIG. 2. On machines having separate memories, the prohibitive performance of transfers from the memory dedicated to the GPU to the main memory makes it unrealistic to implement a rendering engine which would use the two computing units for executing the graph. Indeed, transferring the data stored at the output of a filter executed on the GPU to make it available to the CPU would be too time-consuming.

Mobile platforms ("smartphones", tablets, certain game consoles) are architecturally designed in a different way: for cost reduction purposes, a single memory is available. This memory is accessible both from the CPU and the GPU, and the load on the CPU when sending data to the GPU is significantly alleviated. The GPU driver software simply transfers the location of the data stored in memory rather than the data itself. An example of such an architecture is shown in FIG. 3. A unified-memory architecture allows a system to be developed which aims to reduce the graph computation time by executing each filter on its appropriate target. Since data exchanges between the CPU and the GPU are restricted to exchanges of memory addresses, it is no longer a drawback to sequentially use filters running on different computing units.

The invention provides a method for generating procedural textures for a computer having a unified CPU/GPU memory architecture in which data exchanges between the CPU and the GPU consist in memory address exchanges in the unified CPU and GPU memory, said method allowing textures for contents that are managed by a graphics processor (GPU) to be generated from digital data and operators of a plurality of procedural filters interpreted by means of a rendering engine, and including the steps of:

- receiving the data of a graph consisting of a plurality of filters and sequentially traversing said graph such as to allow, for each filter traversed, the steps of:
  - identifying, from identification data of filter execution targets, the CPU or GPU processor that has been preselected for executing this filter;
  - receiving, from at least one instruction module corresponding to the type of preselected CPU or GPU processor, the instructions for the preselected CPU or GPU version of the filter;
  - receiving, from at least one filter storage module, parameters of the current filter;
  - receiving, from at least one buffer storage module, the buffer addresses of the current filter;
  - applying the values provided for the digital valued filter inputs;
  - executing the filter instructions with the set parameters;
  - storing the intermediate results obtained;
- when all of the filters of the graph have been executed, generating at least one display texture.

The method and device according to the invention are based on the fact that, due to the computations used, certain filters are better suited for execution on a CPU, and others are better suited for execution on a GPU. The best suited target of each filter depends on the operations performed, on whether or not memory accesses are performed on a regular basis, or also on the need to produce unavailable data from existing data, as is done, for example, by the GPUs' texture samplers. For example, a filter reproducing the operating mode of texture samplers of the GPU runs sub-optimally in the CPU, which must programmatically perform operations that are wired in the GPU. This preference is fixed and only depends on the computations performed by said filter. In particular, it does not depend on parameters which modify the operation of a given filter.

According to an advantageous embodiment, for each filter, in addition to a most appropriate CPU or GPU target, any possible implementation on another target if available, is indicated.

According to another advantageous embodiment, when the sequencer traverses a branch in the graph, it attempts to simultaneously traverse a second branch in the graph, by executing, whenever possible, the filters of this second branch on the CPU or GPU computing unit which is not used by the current filter of the main branch.

The invention also provides a device for generating procedural textures for carrying out the above described method, wherein data exchanges between the CPU and the GPU consist in memory address exchanges in a unified CPU and GPU memory, said memory being subdivided into a plurality of areas:

- an area M0, which contains the list of filters to be activated;
- an area M1, which contains the best suited target CPU or GPU of each filter;
- an area M2, which contains the working buffers of the rendering engine;
- areas M3 and M4, which contain the programs associated with the filters, in their CPU versions and in their GPU versions.

Advantageously, area M0 also contains the parameter values for each filter, as well as the dependencies between the various filtering steps.

The invention also provides a computer program product, which is intended to be loaded in a memory associated with a processor, wherein the computer program product includes software code portions implementing the above-described method when the program is executed by the processor.

BRIEF DESCRIPTION OF THE FIGURES

All of the embodiment details are given, by way of non-limiting example, in the following description, with reference to FIGS. 1 to 6, in which.

DETAILED DESCRIPTION OF THE INVENTION

Figure 4:
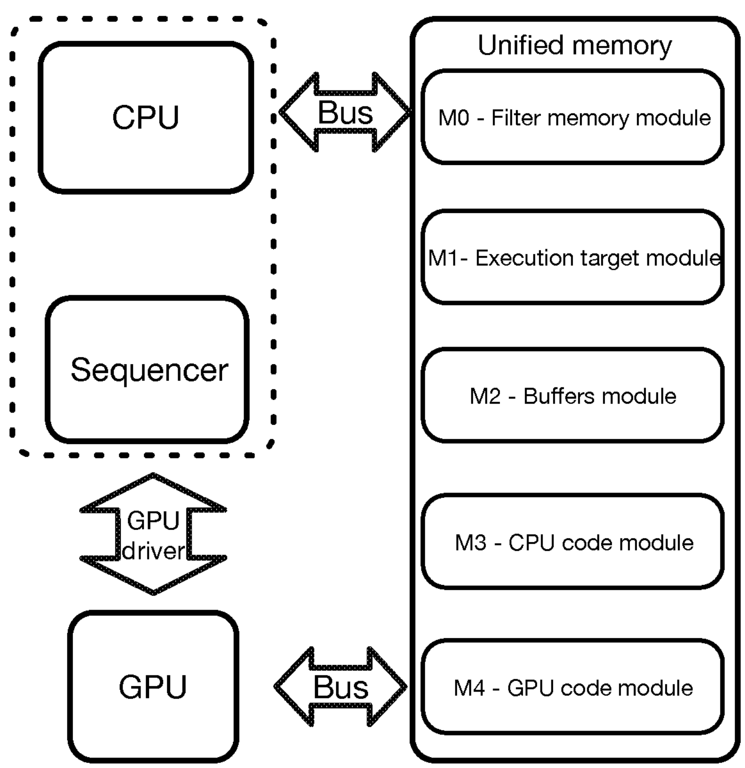
FIG. 4 schematically shows an implementation example of a device for generating procedural textures according to the invention.

An example device on which the present invention is based is shown in FIG. 4. The different elements of this device are:

- the CPU and GPU already described above;

the unified memory, also already described above, connected to both the GPU and the CPU;

the sequencer, which is a program hosted by the CPU in conventional implementations. The sequencer performs the task of traversing the filter list established when constructing the graph, configuring each filter with the appropriate values, and activating each filter at the required time.

the GPU driver, which is a software layer hosted by the CPU for controlling the activity of the GPU. It is through the GPU driver that the sequencer can trigger a particular filter on the GPU, or indicate the GPU from which buffers it must run.

Figure 1:
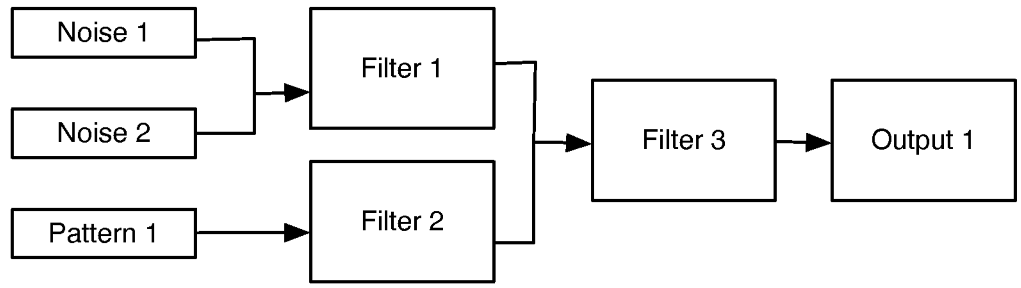
FIG. 1 illustrates an example filter computation graph.
Figure 2:
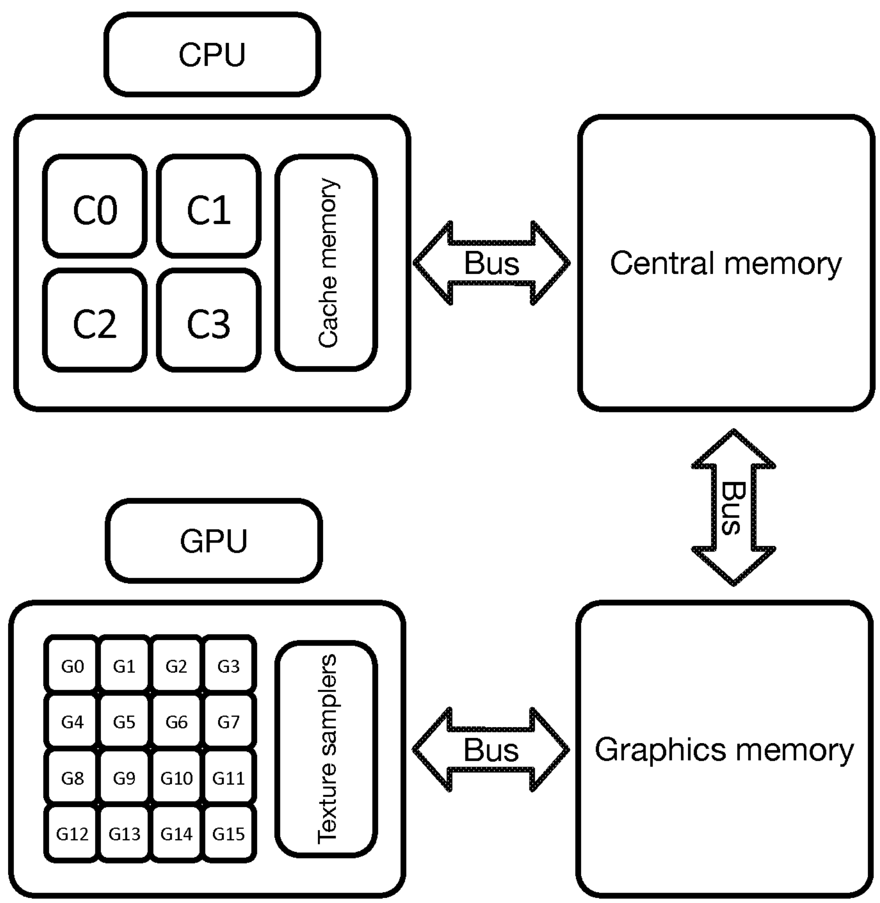
FIG. 2 provides an example architecture having separate CPU/GPU memories commonly used for desktop computers.
Figure 3:
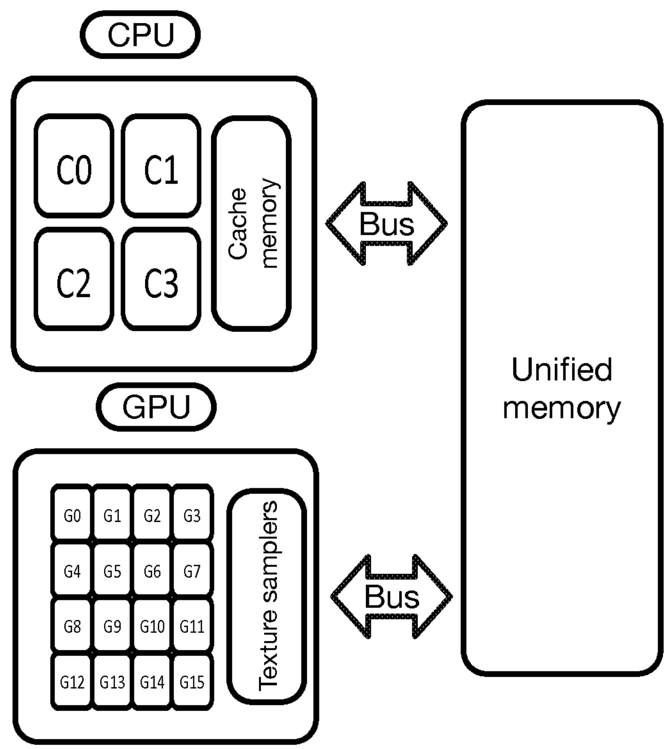
FIG. 3 shows an example architecture with a unified CPU/GPU memory commonly used for mobile computers or devices such as "smartphones", tablets, game consoles, etc., of a known type.

The memory used by the rendering engine may be partitioned into several areas so as to store similar information in contiguous areas:

an area M0, which is initialized when constructing the graph, and contains the list of filters to be activated, the parameter values for each filter, as well as dependencies between the various filtering steps. It is the contents of this memory which transcribe the graph structure constructed when reading the description file.

an area M1, which contains the best-suited target of each filter. This memory may be filled on initialization of the engine, but its contents can also change according to the platform on which rendering is performed.

an area M2, which contains the working buffers of the rendering engine. These buffers are the temporary storage areas for intermediate images computed by the filters. In the example presented in FIG. 1, the output of filter 1 to be used by filter 3 would be stored in a temporary buffer.

areas M3 and M4, which contain the programs associated with the filters, in their CPU versions and in their GPU versions. When the graph is traversed and the filters are executed by the sequencer, the code to be executed on the CPU or on the GPU will be read from these memories. It is possible to store in these memories only those code filters for which an implementation on the given target is of interest, so as not to overload the memory footprint with entirely inadequate implementations of certain filters.

One main aspect of the solution presented herein is to integrate a memory within the sequencer, which contains, for each filter available, its most appropriate target, and to modify the graph traversal loop in order to make use of this new information. Thus, each filter is executed on the target which guarantees a minimum computation time, thereby optimizing the overall computation time of the graph. In a first stage, the preference of each filter is expressed in a binary manner, so as to indicate that:

this filter must run on the CPU;

this filter must run on the GPU.

Figure 5:
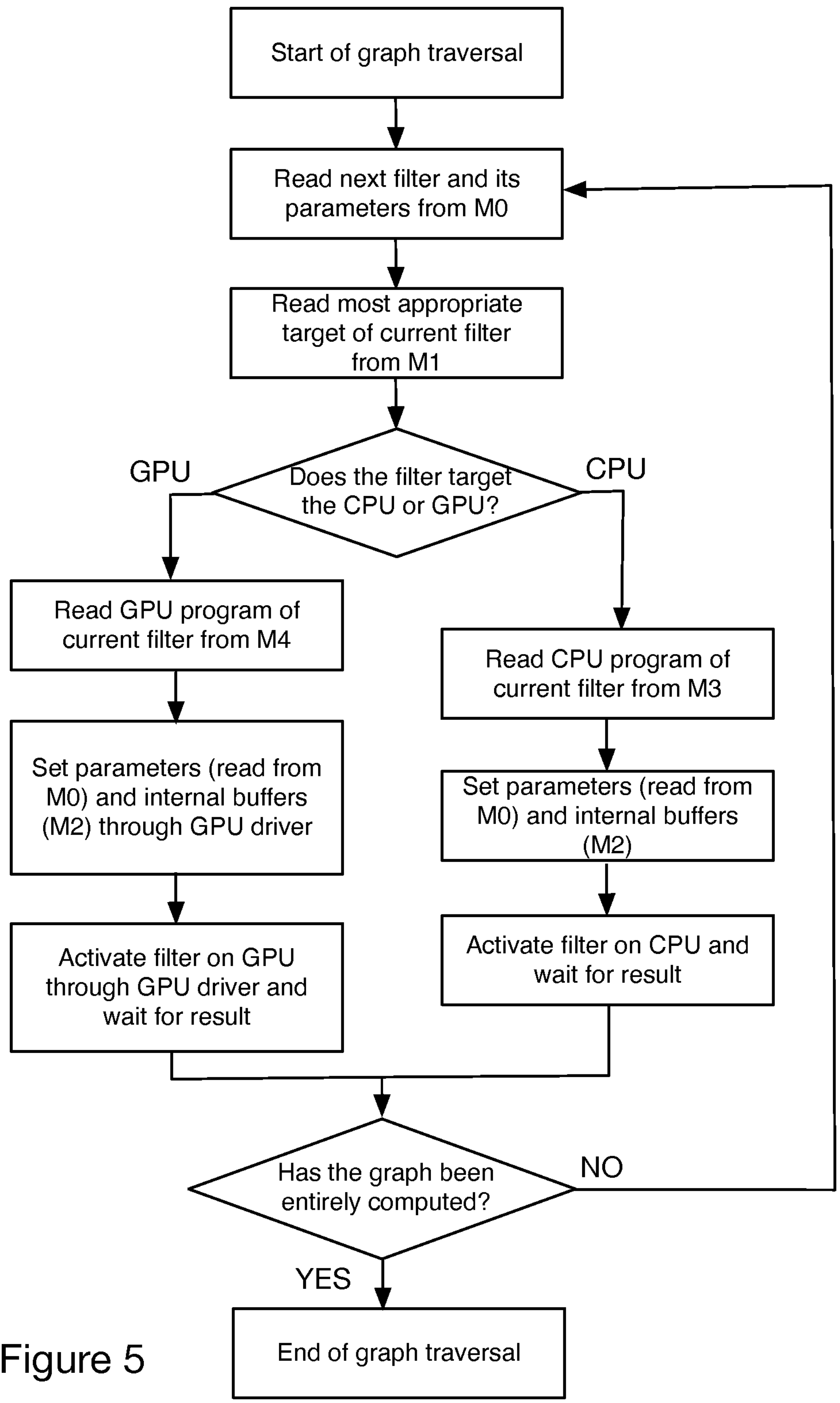
FIG. 5 shows the different steps of the method according to the invention with the graph traversal allowing the procedural textures to be generated.

In its simplest implementation, the method considers only one binary preference for each filter, which indicates on which target the filter in question should run. The associated graph traversal method is illustrated in FIG. 5:

when traversing the graph (sequential reading of memory M0), identify, for each filter called, its appropriate target, stored in memory M1;

load the adapted version of the filter from memory M3 or M4, according to the target identified in the previous step;

set the parameter values used (which have been read from M0 when identifying the filter), as well as the addresses of the internal buffers to be used (memory M2), either directly before calling the filter in case of execution on a CPU, or through one or more calls to the GPU driver in the case of the GPU;

execute the code read from memory M3 or M4, either directly when executed on a CPU, or through one or more calls to the GPU driver in the case of the GPU.

The proposed method can ensure that each filter is executed on the target where its execution is most advantageous, with the execution speed being the criterion generally used. However, this approach only makes use, at a given time, of a single computing unit of the two available. To further optimize processor use, the expressivity of the contents of memory M1 is increased so as to express a more flexible preference. It is thus possible to consider indicating, for each filter, not only its appropriate target, but also whether an implementation is possible on another target if available, as follows:

this filter only runs on a CPU;

this filter only runs on a GPU;

this filter preferably runs on the CPU but an implementation exists for the GPU;

this filter preferably runs on the GPU but an implementation exists for the CPU.

Figure 6:
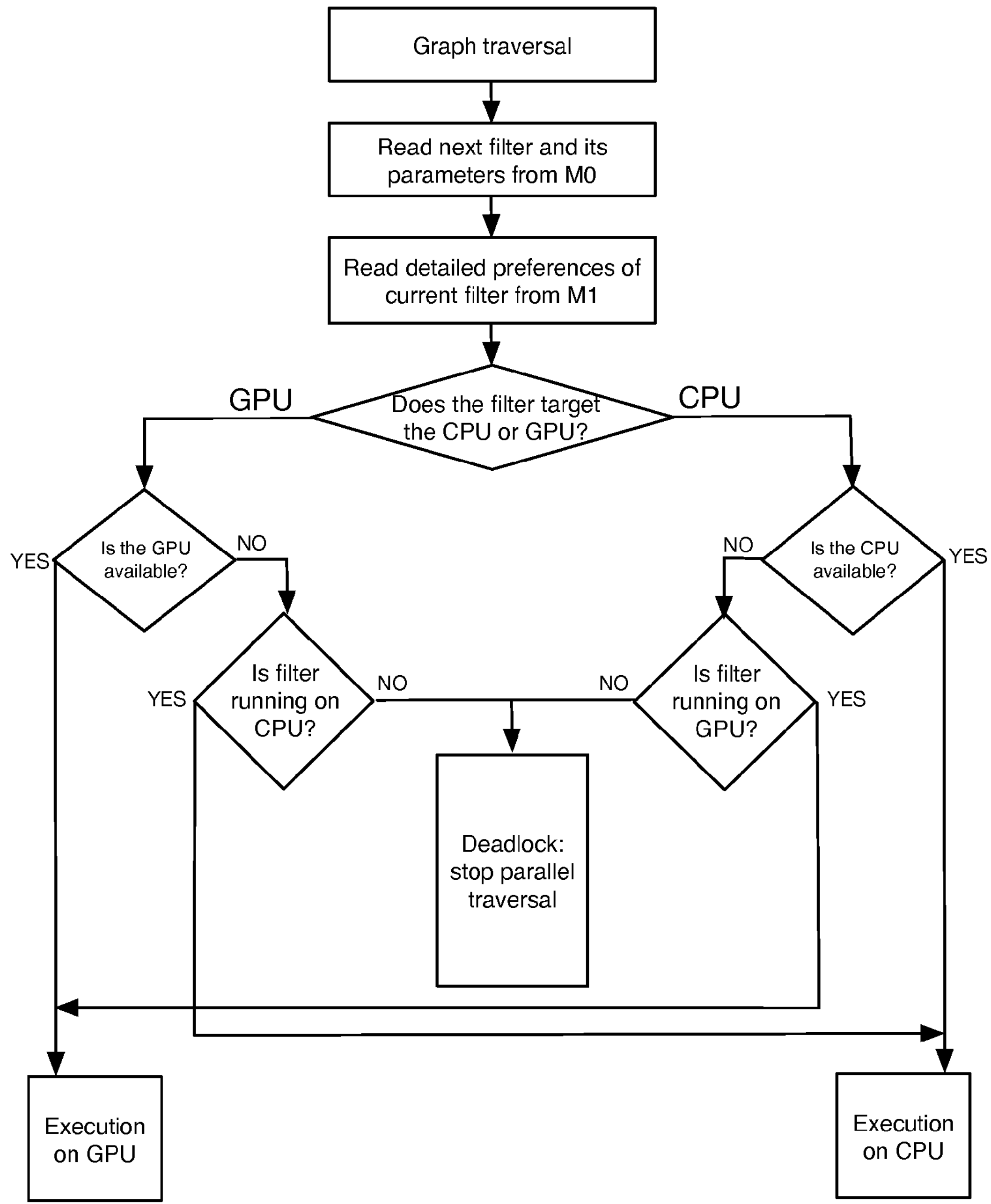
FIG. 6 shows an alternative embodiment of the method according to the invention with parallel traversal of primary and secondary branches.

When the sequencer traverses a branch in the graph, it can also attempt to simultaneously traverse a second branch in the graph, by executing, whenever possible, the filters of this second branch on the computing unit which is not used by the current filter of the "main" branch. This simultaneous traversal of two graph branches in parallel stops whenever the sequencer reaches a point where the filters of the primary and secondary branches must run on the same computing unit. In this case, priority is given to the primary branch, and the traversal of the secondary branch resumes once the two filters to be executed can run on different targets. This advantageous alternative of the filter routing method is illustrated in FIG. 6.

Others Alternative Embodiments

The description of the present solution is based on the two computing units commonly available today, namely the CPU and the GPU. If another kind of specialized processor is available on a given architecture, it is then possible to extend the present solution to three or more computation units (CPU, GPU, xPU . . . ). In this case, it is necessary to increase the expressivity of the contents of memory M1 so that the third unit can be integrated into the expression of the preferences of each filter, and to add a memory for storing the xPU version of the code of each filter, or only of those filters for which an xPU implementation is of interest.

It is also possible to rank the preference of each filter according to the targets (CPU>GPU>xPU, for example). In this manner, more graph branches can be traversed in parallel, or the number of branches traversed in parallel can be chosen and restricted, and the number of options available to facilitate the computation of the secondary branch can be increased, in order to avoid the above mentioned deadlock situation.

Another alternative embodiment of the present solution is to use software or hardware means to assess the current load level of the various computation units used. Moreover, if, for each filter, its quantified performance is available for each target on which it can be executed, then the filter routing process can be made even more flexible by evaluating composite metrics computed from the theoretical impact of each filter on the considered computing unit, taking its current load into account.

The invention claimed is:

1. A method for generating procedural textures for a computer having a unified CPU/GPU memory architecture in which data exchanges between a CPU and a GPU consist in memory address exchanges in a unified CPU-GPU memory, the method allowing textures for contents that are managed by the GPU to be generated from digital data and operators of a plurality of procedural filters interpreted by means of a rendering engine, and including the steps of:

receiving data of a graph consisting of a plurality of filters and sequentially traversing said graph using a sequencer and the unified CPU-GPU memory whereby data exchanges between the CPU and the GPU consist in memory address exchanges in the unified CPU-GPU memory, the unified CPU-GPU memory being provided with a memory area M1 that contains target data containing a best suited processing target among CPU processing only or GPU processing only, of each filter, such as to allow, for each filter traversed:

identifying, based on the target data containing the best suited processing target among CPU processing only or GPU processing only, one of a CPU only processor or a GPU only processor that has been preselected for executing each filter;

receiving, from at least one instruction module corresponding to the preselected CPU only or GPU only processor, CPU instructions when the preselected processor is the CPU, provided in a memory area M3 of the unified CPU-GPU memory which contain the CPU instructions associated with each filter, in their CPU versions, or GPU instructions when the preselected processor is the GPU, provided in a memory area M4 of the unified CPU-GPU memory which contains the GPU instructions associated with each filter, in their GPU versions;

receiving, from at least one filter storage module, parameters of a current filter provided in a memory area M0 of the unified CPU-GPU memory, initialized during graph generation, containing a list of filters to be activated, parameter values for each filter, and dependencies between various filtering steps;

receiving, from at least one buffer storage module, buffer addresses of the current filter provided in an area M2 of the unified CPU-GPU memory which contains working buffers data of a rendering engine for temporary image data obtained during processing by the CPU or GPU;

applying the parameter values provided for digital valued filter inputs;

executing the filter instructions with the parameter values such as to execute the filter on the best suited processing target providing a minimal global calculation time;

storing intermediate results obtained by executing the filter instructions; and when all of the filters of the graph have been executed by the CPU and the GPU, generating, using a rendering engine, at least one display texture.

2. The method for generating procedural textures according to claim 1, wherein, for each filter, in addition to a most appropriate CPU or GPU target, any possible implementation on another target, if available, is indicated.

3. The method for generating procedural textures according to claim 1, wherein, when the sequencer traverses a first branch in the graph, the sequencer attempts to simultaneously traverse a second branch in the graph, by executing, whenever possible, the filters of the second branch on the CPU or GPU which is not used by the current filter of the first branch.

* * * * *